Sept. 18, 1951 E. CONGDON 2,568,431

WINDING DEVICE

Filed April 19, 1949 3 Sheets-Sheet 1

Inventor:
Ernest Congdon
by his Attorneys
Howson & Howson

WINDING DEVICE

Filed April 19, 1949 3 Sheets-Sheet 2

Inventor:
Ernest Congdon
by his Attorneys
Howson & Howson

WINDING DEVICE

Filed April 19, 1949 3 Sheets-Sheet 3

Inventor:
Ernest Congdon
by his Attorneys
Howson & Howson

Patented Sept. 18, 1951 2,568,431

UNITED STATES PATENT OFFICE 2,568,431

WINDING DEVICE

Ernest Congdon, Upper Darby, Pa.

Application April 19, 1949, Serial No. 88,501

10 Claims. (Cl. 242—55)

This invention relates to web or tape winding devices and more particularly to a novel device for discretely winding successive portions of a flexible web or tape.

In certain instances it is necessary to wind a flexible web or tape which is being fed intermittently or at varying speeds. For example, in banking establishments it is necessary to keep a record of cancelled checks, and such record is frequently kept on a paper web or tape which is passed through a marking or printing machine controlled by an operator. In such cases the movement of the web or tape is intermittent and at varying speed according to the manual operation of the marking or printing machine. The winding of a web or tape in such a situation has heretofore presented a problem.

The principal object of the present invention is to provide a novel device which is adapted automatically to wind a web or tape that may be fed intermittently and at varying speed.

Another object of the invention is to provide an automatic device which is adapted to wind discretely successive portions of a web or tape, and which does not subject the web or tape to objectionable tension.

A further object of the invention is to provide a device of this character which is simple in construction and which may be manufactured and sold at a reasonable cost.

Other objects of the invention will be apparent from the following detailed description with reference to the accompanying drawings wherein.

Figures 1, 4:
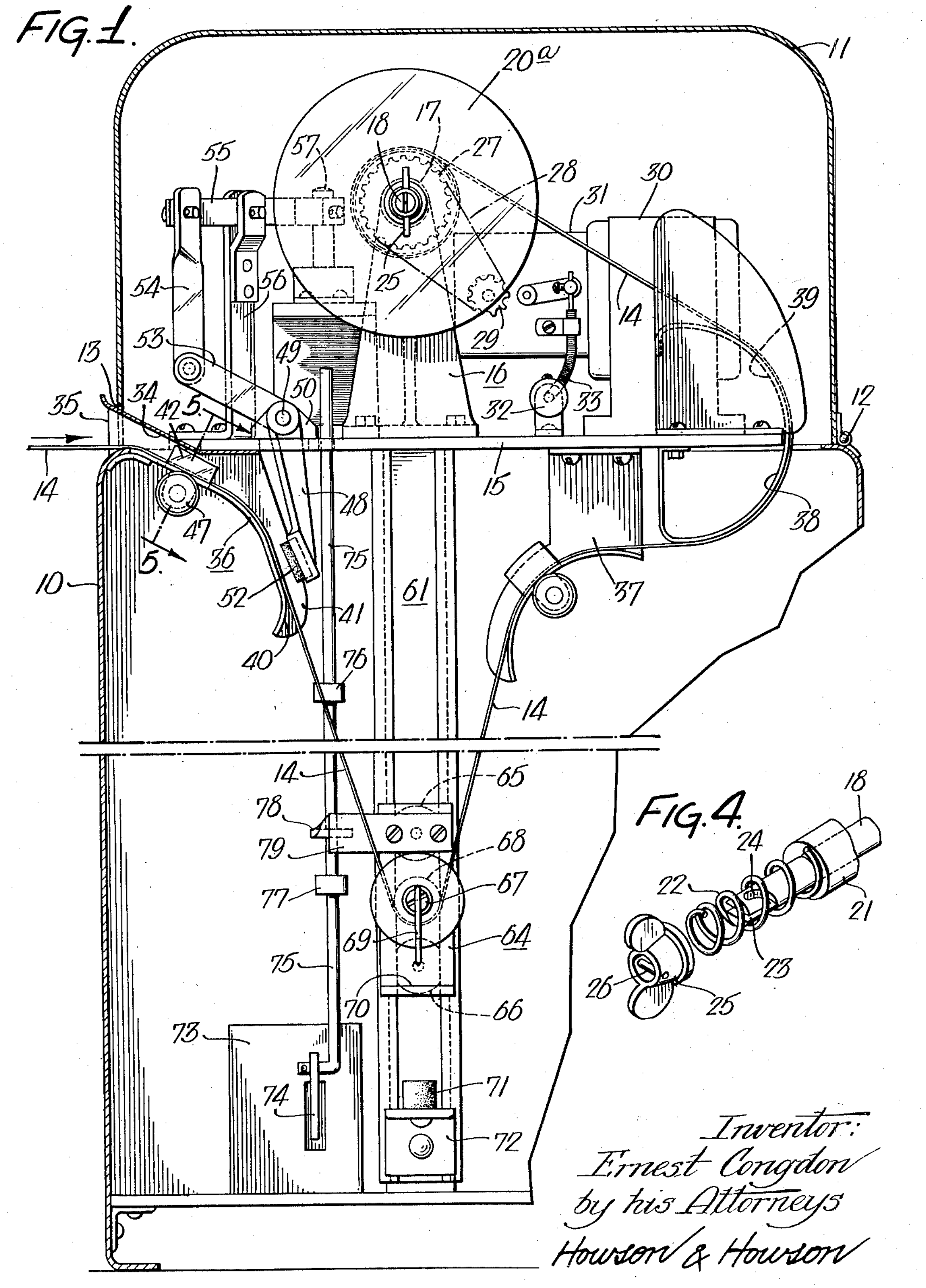
Fig. 1 is an elevational view of the operating mechanism of a preferred form of the device, with the enclosing casing or housing shown in section.
Fig. 4 is a perspective view of the locking arrangement for the winding spool.
Figure 2:
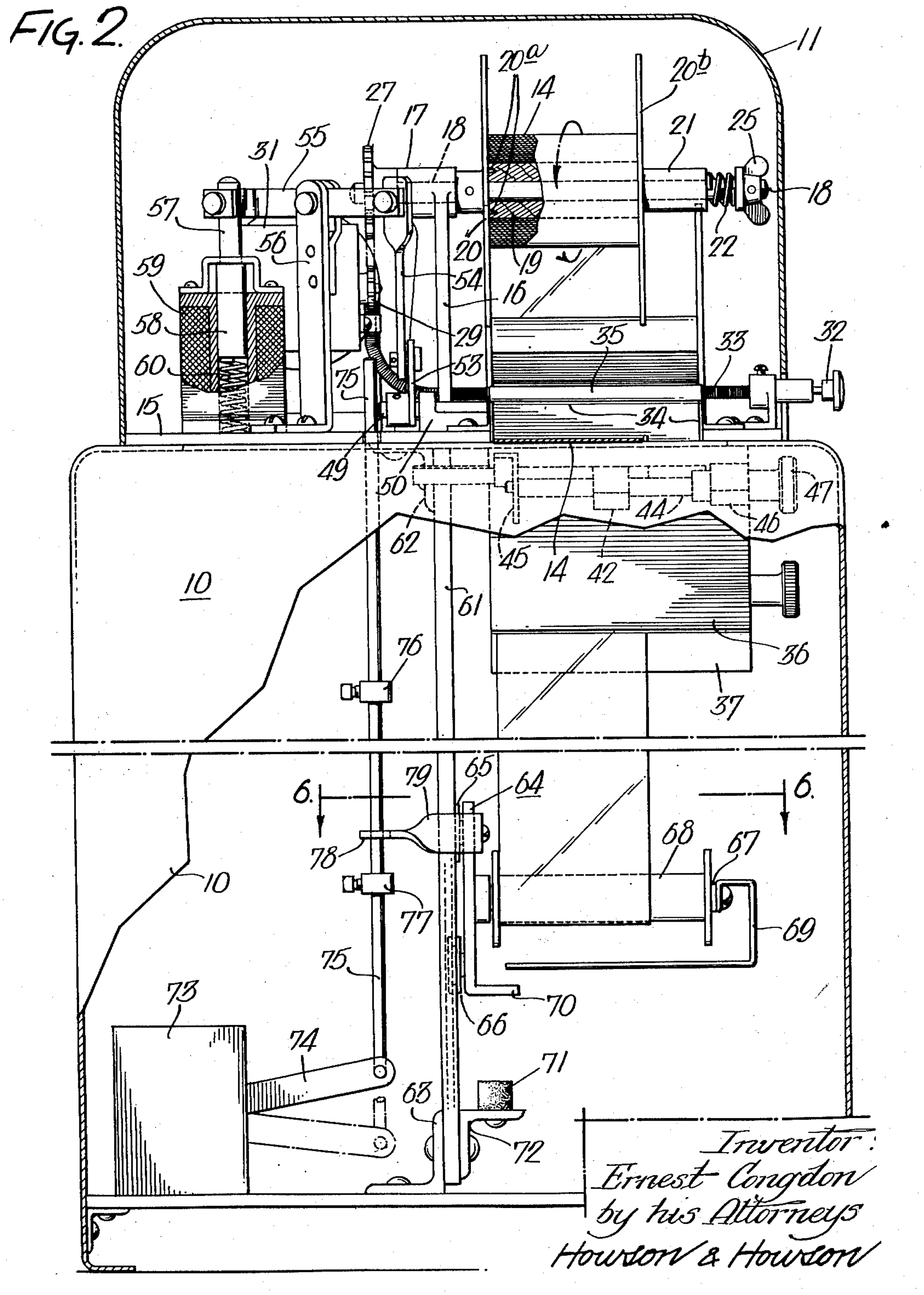
Fig. 2 is a similar view taken from another position.
Figures 3, 5, 6:
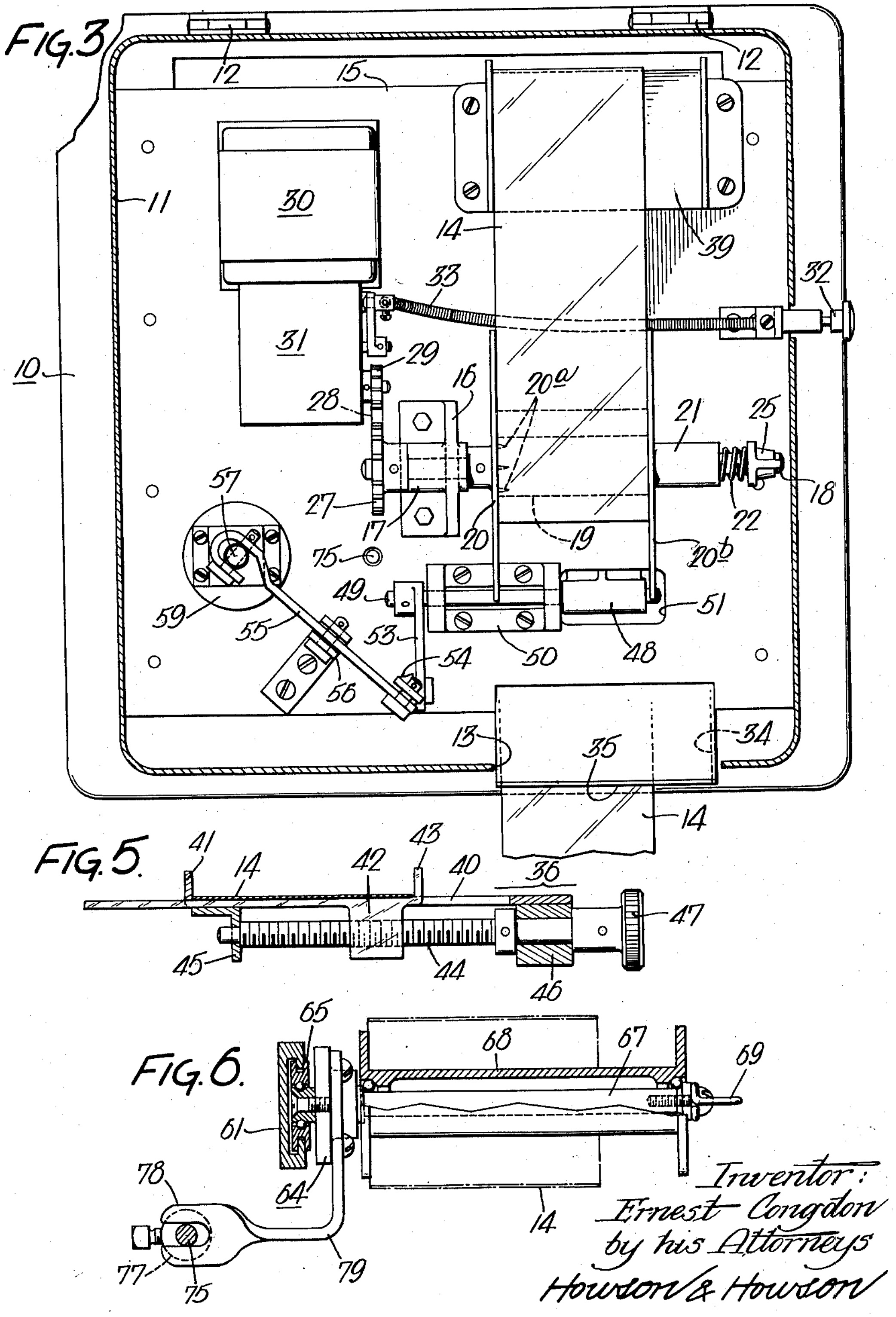
Fig. 3 is a plan view, with the housing shown in section.
Fig. 5 is a detail sectional view taken along line 5—5 of Fig. 1.
Fig. 6 is a detail sectional view taken along line 6—6 of Fig. 2.

Referring particularly to Figs. 1 to 3, there is provided a lower casing or housing 10, and an upper cover 11 which is hingedly attached to the housing 10 at 12 and which is provided with an opening 13 through which a flexible web or tape 14 may pass. At the top of the lower casing 10 there is provided a horizontal supporting panel 15 which serves to support certain of the elements as hereinafter described. A supporting standard 16 is mounted on the panel 15 and has a bearing 17 at its upper end which serves to support a rotatable shaft 18 for a removable winding spool 19. Mounted on shaft 18 is a disk or plate 20 having prongs 20a adapted to bite into spool 19 which may be formed of wood. A second disk or plate 20b is free on shaft 18 and engages spool 19. A spacer sleeve 21 bears against disk 20b and is held thereagainst by a spring 22. The purpose of this arrangement is to accommodate spools of different lengths, the sleeve 21 being replaceable by one of proper length in any instance. As may be seen in Fig. 4, the end portion of shaft 18 is provided with a slot 23 which communicates with an arcuate slot 24 also provided in the shaft. A winged retainer 25 is adapted to fit over the end of the shaft 18 and has a transverse pin 26 which may ride in slot 23 and which may seat in slot 24 upon turning of the retainer 25. It will be seen that this provides a locking arrangement by which the retainer 25 is removably locked to the shaft 18 and places the spring 22 under compression.

The end of shaft 18 on the other side of the bearing 17 carries a sprocket 27 which is connected by a chain 28 to a driving gear 29. The gear 29 is driven from an electric motor 30 through a conventional gear reduction and clutch unit 31. The clutch of said unit is operable from a control knob 32 located on the outside of the housing, through a flexible shaft connection 33. By means of this arrangement it is possible to stop rotation of the winding spool 19 without deenergizing the driving motor.

As shown in Fig. 1, the flexible web or tape 14 is caused to pass into the housing 10 and to assume a vertical loop therein. As described hereinafter, the discrete winding of successive portions of the web or tape is automatically controlled according to the length of the vertical loop. At the place of entry of the web or tape the housing 10 has an inlet opening 34 and a mouth 35. A guide 36 is provided adjacent the inlet opening and serves to support one side of the vertical loop. A guide 37 is provided at the opposite side of the vertical loop to support the same. From the latter guide, the web or tape passes over guide members 38 and 39 to the winding spool 19.

Each of the guides 36 and 37 is adjustable as to width to accommodate webs or tapes of different widths. Fig. 5 shows the construction of one of these adjustable guides, i. e. guide 36, it being understood that the other adjustable guide is similarly constructed. Referring to Fig. 5, the guide comprises a stationary member 40 having a guide flange 41 and an adjustable member 42 having a flange 43 which extends through a slot in member 40. The movable member 42 threadedly engages a rotatable screw shaft 44 which is rotatably supported by bearing elements 45 and 46. The shaft is rotatable by a knob 47.

During the winding of a portion of the web or tape, as hereinafter described, the web or tape is securely held at the feed side of the vertical loop by means of a brake mechanism now to be described. A brake arm 48 has one end attached to a shaft 49 which is disposed above panel 15 and is rotatably supported by a bearing support 50. The arm 48 extends downward through an opening 51 in panel 15 and carries a brake pad 52 at its lower end which is adapted to engage the web or tape 14 where the latter is supported by the guide 35. A crank arm 53 extends from shaft 49 and is connected by a link 54 to a lever 55 which is fulcrumed on a vertical support 56. The lever 55 is connected to an extension 57 of the armature 58 of a solenoid 59. The armature 58 is urged upward by a spring 60. When the solenoid is deenergized the brake pad 52 is out of engagement with the web or tape and is so held by the action of spring 60. However, when the solenoid is energized the brake pad 52 is caused to engage the web or tape, the solenoid armature 58 being drawn downward against the force of spring 60.

Referring particularly to Figs. 1 and 2, a vertical guide 61 is provided in the housing 10, being supported therein by angle brackets 62 and 63. A carriage 64 is freely movable along the guide 61, being provided with wheels 65 and 66 which are interengaged with the guide 61 as shown in Fig. 6. The carriage 64 has mounted thereon a horizontally extending rod 67 which rotatably supports a roller 68. This roller is adapted to engage the bottom of the vertical loop, the web or tape 14 passing about the roller, as may be seen in Fig. 1. A guard rod 69 is secured to the outer end of rod 67 and extends beneath the roller 68. The lower end of carriage 64 has a lateral extension 70 which is adapted to engage a resilient stop 71 mounted on bracket 72 which is secured to the lower part of guide 61.

A conventional on-off switch 73 is disposed at the bottom of housing 10 and has an operating arm 74 which is connected to a vertical rod 75. This rod carries a pair of adjustable collars 76 and 77 which are engaged by the bifurcated end 78 of a finger 79 carried by the carriage 64. The upper portion of rod 75 extends through an opening in panel 15.

The driving motor 30 and the solenoid 59 are connected in parallel relation to an electrical supply source, and the switch 73 is connected in series with both the motor and the solenoid. The switch is actuated according to the length of the vertical loop of the web or tape 10 by the finger 79 on the movable carriage 64.

Considering the operation of the device, Figs. 1 and 2 show the mechanism at a time when the motor and solenoid are deenergized and the web or tape 14 is being drawn into housing 10 by the gravitation of carriage 64. It will be understood that the weight of the carriage and the elements attached thereto causes the vertical loop to elongate and draws the web or tape into the device. When the finger 79 engages the lower collar 77, the switch 73 is closed thereby, energizing the motor 30 and solenoid 59. This causes simultaneous commencing of rotation of the winding spool 19 and application of the brake 52 to the web or tape at the feed side of the vertical loop. With the web or tape firmly held at the point where the brake is applied, the portion of the web or tape beyond such point is drawn toward and on to the winding spool, the carriage 64 being drawn upward and the vertical loop becoming shorter. When the finger 79 engages the upper collar 76, the rod 75 is moved upward and opens the switch 73. This deenergizes the motor 30 and the solenoid 59, causing stoppage of the winding spool and release of the brake. Thereupon the carriage 64 again gravitates, drawing more of the web or tape into the device and causing the vertical loop to elongate. This cyclic operation is automatically repeated as long as the web or tape is free to be drawn into the device. It will be seen that the device discretely winds successive portions of the web or tape, the winding action taking place only when there is a certain length of tape within the device as determinal by the length of the vertical loop. Thus the device will never subject the web or tape to objectionable tension. It at any time the web or tape is not sufficiently free to permit complete elongation of the vertical loop, the carriage 64 simply remains suspended and the device remains inoperative until the web or tape is sufficiently free to permit complete elongation of the vertical loop. The weight of the carriage 64 and the associated elements is not sufficient to subject the web or tape to objectionable tension.

The device is particularly useful in conjunction with a machine which may feed the web or tape intermittently or at varying speed. Thus it is useful in conjunction with a marking or printing machine such as used in banking establishments to record check data, as previously mentioned.

While a preferred embodiment of the invention has been illustrated and described, it will be apparent that the invention is not limited thereto but is capable of modifications and other embodiments.

I claim:

1. A device for discretely winding successive portions of a flexible web or tape, comprising a winding spool, controllable means for driving said spool, means for causing the web or tape to assume a vertical loop in its travel toward said spool, said last means including a member about which the web or tape passes and which is freely movable vertically, brake means engageable with the web or tape at the feed side of the vertical loop, and means for rendering said driving means and said brake operative when said loop is of predetermined maximum length, and for rendering said driving means and said brake means inoperative when said loop is of a predetermined minimum length, whereby the web or tape is held at the feed side of said loop while a portion of the web or tape is wound on said spool, and then the spool remains stationary while another portion of the web or tape is drawn into the device by gravitation of said member.

2. A device for discretely winding successive portions of a flexible web or tape, comprising a winding spool, an electric motor for driving said spool, means for causing the web or tape to assume a vertical loop in its travel toward said spool, said last means including a member about which the web or tape passes and which is freely movable vertically, an electrically-operable brake engageable with the web or tape at the feed side of the vertical loop, and means for energizing said motor and said brake to render them operative when said loop is of predetermined maximum length, and for deenergizing said motor and said brake to render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said member.

3. A device for discretely winding successive portions of a flexible web or tape, comprising a winding spool, an electric motor for driving said spool, means for causing the web or tape to assume a vertical loop in its travel toward said spool, said last means including a member about which the web or tape passes and which is freely movable vertically, an electrically-operable brake engageable with the web or tape at the feed side of the vertical loop, switch means for controlling said motor and said brake, and means for actuating said switch means to energize said motor and said break and thus render them operative when said loop is of predetermined maximum length, and for actuating said switch means to deenergize said motor and said brake and thus render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said member.

4. A device for discretely winding successive portions of a flexible web or tape, comprising a winding spool, an electric motor for driving said spool, means for causing the web or tape to assume a vertical loop in its travel toward said spool, said last means including a member about which the web or tape passes and which is freely movable vertically, an electrically-operable brake engageable with the web or tape at the feed side of the vertical loop, a switch for controlling said motor and said brake, and means for closing said switch to energize said motor and said brake and thus render them operative when said loop is of predetermined maximum length, and for opening said switch to deenergize said motor and said brake and thus render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said member.

5. A device for discretely winding successive portions of a flexible web or tape, comprising a winding spool, an electric motor for driving said spool, vertical guide means, a carriage freely movable in said guide means, a roller supported by said carriage, means cooperative with said roller to cause the web or tape to assume a vertical loop in its travel toward said spool, said roller engaging the bottom of the loop, an electrically-operable brake engageable with the web or tape at the feed side of the vertical loop, switch means for controlling said motor and said brake, and means operable by movement of said carriage to actuate said switch means so as to energize said motor and said brake and thus render them operative when said loop is of predetermined maximum length, and to deenergize said motor and said brake and thus render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said carriage.

6. A device for discretely winding successive portions of a flexible web or tape, comprising a winding spool, an electric motor for driving said spool, vertical guide means, a carriage freely movable in said guide means, a roller supported by said carriage, means cooperative with said roller to cause the web or tape to assume a vertical loop in its travel toward said pool, said roller engaging the bottom of the loop, an electrically-operable brake engageable with the web or tape at the feed side of the vertical loop, a switch for controlling said motor and said brake, a movable vertical rod connected to said switch to actuate the same and arranged in proximity to said guide means, and cooperative means on said carriage and said rod for moving the rod so as to close said switch and thus energize said motor and said brake to render them operative when said loop is of predetermined maximum length, and to open said switch and thus deenergize said motor and said brake to render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said carriage.

7. A device for discretely winding successive portions of a flexible web or tape, comprising a winding spool, an electric motor for driving said spool, vertical guide means, a carriage freely movable in said guide means, a roller supported by said carriage, means cooperative with said roller to cause the web or tape to assume a vertical loop in its travel toward said spool, said roller engaging the bottom of the loop, an electrically-operable brake engageable with the web or tape at the feed side of the vertical loop, a switch for controlling said motor and said brake, a movable vertical rod connected to said switch to actuate the same and arranged in proximity to said guide means, a pair of spaced collars on said rod, and a finger on said carriage engageable with said collars to move the rod so as to close said switch and thus energize said motor and said brake to render them operative when said loop is of predetermined maximum length, and to open said switch and thus deenergize said motor and said brake to render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said carriage.

8. A device for discretely winding successive portions of a flexible web or tape, comprising a horizontal support, a winding spool mounted on said support, an electric motor on said support for driving said spool, means defining a space of substantial depth below said support through which the web or tape may pass before reaching said spool, vertical guide means in said space, a carriage freely movable in said guide means, a roller supported by said carriage, means cooperative with said roller to cause the web or tape to assume a vertical loop in its travel through said space, said roller engaging the bottom of the loop, an electrically-operable brake engageable with the web or tape at the feed side of the vertical loop, switch means for controlling said motor and said brake, and means operable by movement of said carriage to actuate said switch means so as to energize said motor and said brake and thus render them operative when said loop is of predetermined maximum length, and to deenergize said motor and said brake and thus render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said carriage.

9. A device for discretely winding successive portions of a flexible web or tape, comprising a horizontal support, a winding spool mounted on said support, an electric motor on said support for driving said spool, means defining a space of substantial depth below said support through which the web or tape may pass before reaching said spool, vertical guide means in said space, a carriage freely movable in said guide means, a roller supported by said carriage, means cooperative with said roller to cause the web or tape to assume a vertical loop in its travel through said space, said roller engaging the bottom of the loop, an electrically-operable brake engageable with the web or tape at the feed side of the vertical loop, a switch for controlling said motor and said brake, a movable vertical rod connected to said switch to actuate the same and arranged in proximity to said guide means, and cooperative means on said carriage and said rod for moving the rod so as to close said switch and thus energize said motor and said brake to render them operative when said loop is of predetermined maximum length, and to open said switch and thus deenergize said motor and said brake to render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said carriage.

10. A device for discretely winding successive portions of a flexible web or tape, comprising a horizontal support, a winding spool mounted on said support, an electric motor on said support for driving said spool, means defining a space of substantial depth below said support through which the web or tape may pass before reaching said pool, vertical guide means in said space, a carriage freely movable in said guide means, a roller supported by said carriage, means cooperative with said roller to cause the web or tape to assume a vertical loop in its travel through said space, said roller engaging the bottom of the loop, an electrically-operable brake engageable with the web or tape at the feed side of the vertical loop, a switch for controlling said motor and said brake, a movable vertical rod connected to said switch to actuate the same and arranged in proximity to said guide means, a pair of spaced collars on said rod, and a finger on said carriage engageable with said collars to move the rod so as to close said switch and thus energize said motor and said brake to render them operative when said loop is of predetermined maximum length, and to open said switch and thus deenergize said motor and said brake to render them inoperative when said loop is of predetermined minimum length, whereby the web or tape is held at the feed side of said loop while a portion of the web or tape is wound on said spool, and then the spool remains stationary while another portion of the web or tape is drawn into the device by gravitation of said carriage.

ERNEST CONGDON.

REFERENCES CITED

The following references are of record in the file of this patent:

UNITED STATES PATENTS

| Number | Name | Date |
|---|---|---|
| 1,822,770 | Eitzen | Sept. 8, 1931 |
| 2,221,922 | Newman | Nov. 19, 1940 |